United States Patent [19]
Vacano

[11] 3,814,003
[45] June 4, 1974

[54] BREWING APPARATUS

[75] Inventor: Nickolas Lothar Vacano, Seattle, Wash.

[73] Assignee: The Rainier Companies, Inc., Seattle, Wash.

[22] Filed: Nov. 20, 1972

[21] Appl. No.: 308,135

Related U.S. Application Data

[63] Continuation-in-part of Ser. No. 82,404, Oct. 20, 1970.

[52] U.S. Cl.................................. 99/276, 99/646 S
[51] Int. Cl............................................... C12b 1/10
[58] Field of Search .......... 99/275, 276, 277, 277.1, 99/277.2, 278, 646 S, 31, 52

[56] References Cited
UNITED STATES PATENTS

| | | | |
|---|---|---|---|
| 2,036,167 | 3/1936 | Cox.................................. | 99/277.1 |
| 2,899,884 | 8/1959 | Herbruck........................... | 99/646 S |
| 3,374,726 | 3/1968 | Takayanagi.......................... | 99/275 |
| 3,478,669 | 11/1969 | Lanes.................................. | 99/276 |

*Primary Examiner*—Robert W. Jenkins
*Attorney, Agent, or Firm*—Merriam, Marshall, Shapiro & Klose

[57] ABSTRACT

A large size thin-shelled outdoor metal tank, such as for making beer, with a conical metal bottom having a shallow slope of no more than 25° from the horizontal, a conduit communicating with the tank interior at the apex of the conical bottom, a circular cylindrical vertical metal wall joined to the bottom, a metal roof joined to and supported by the vertical wall, insulation exterior of the bottom, wall and roof, a vent opening in the roof, a manifold centrally located in the tank spaced above the bottom and the level of unsuspended solids which may settle therein, said manifold having a plurality of openings through which carbon dioxide gas can exit into liquid in the tank, and a pipe leading from outside the tank to the manifold for supplying carbon dioxide thereto. The tank can have a tubular ring positioned inside the tank adjacent the periphery of the bottom, a pipe communicating with the ring and the exterior of the tank for supplying fluid to the ring, and a plurality of holes in the ring from which fluid under pressure can be ejected along the slope of the bottom to wash solids to the conduit in the bottom for removal.

11 Claims, 10 Drawing Figures

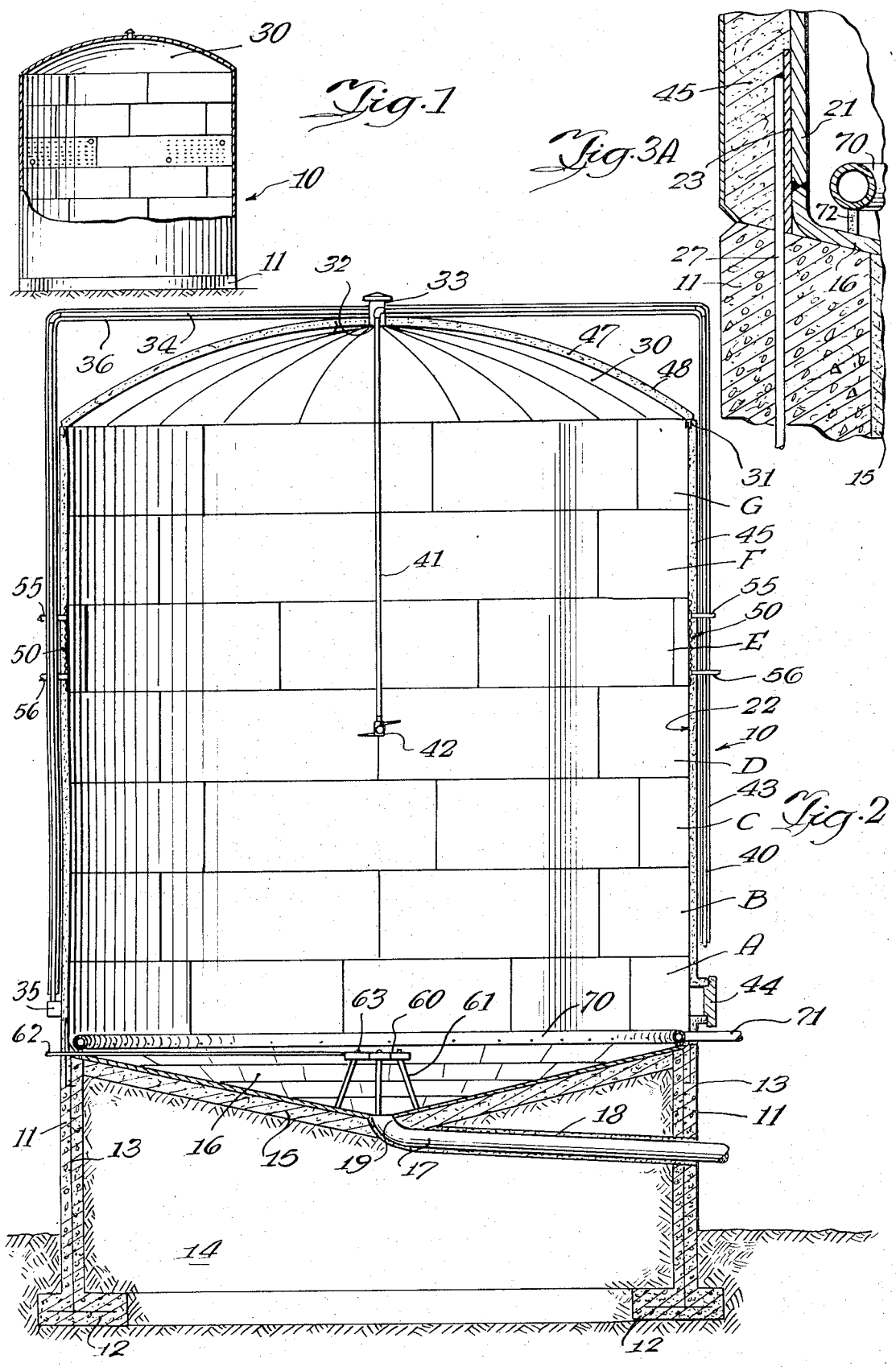

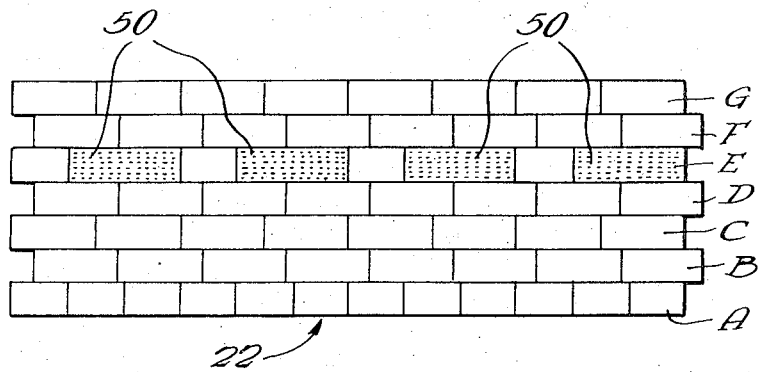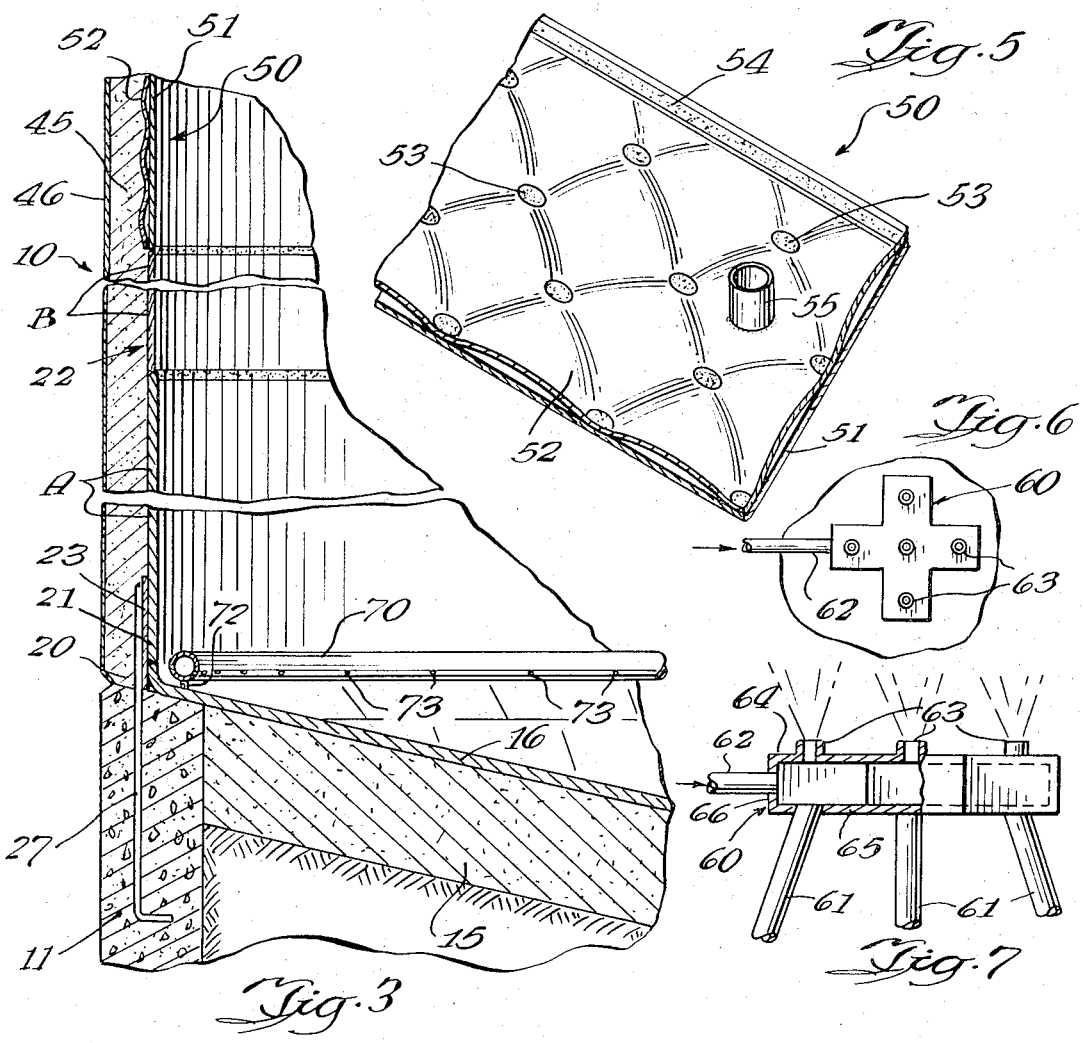

BREWING APPARATUS

This application is a continuation-in-part of my copending application Ser. No. 82,404 filed Oct. 20, 1970, now U.S. Patent 3,729,321.

This invention relates to the production of beer. More particularly, this invention is concerned with improvements in the process of producing beer starting with the wort, fermenting the wort with yeast to form green beer, aging of the beer and the subsequent finishing operation, as well as improved apparatus for producing beer.

As used in this application, the term "beer" refers to the various fermented malt beverages commonly included within that term but also including ale, porter, stout and malt liquor. By "green beer" is meant generally the beer obtained from the fermentation of the wort before it is aged. The term "fermentation" includes all beer processing steps in which yeast cells act on carbohydrates and convert them to alcohol, carbon dioxide and fermentation by-products.

In the production of beer, malt with or without added starchy adjuncts or similar enzymatic conversion system, is heated with water and the resulting mash is filtered to produce a liquid containing soluble brewing material. This liquid extract is known as wort. The wort, with or without a prior treatment with hops or hops extract, is then fermented by yeast at a suitable temperature to produce green bear. The green bear is separated from the yeast by means of decantation or centrifugation and the green bear is thereafter cooled and placed in storage for aging, during which solids settle from the beer. The aged beer is thereafter finished, such as by treatment with materials such as various proteolytic enzymes, tannins, bentonites and other chill-proofing agents, and anti-oxidants, following which it is filtered, carbonated and then packaged.

In conventional brewery cellar processing, a series of decantations is involved in which supernatant beer is transferred from one tank to another to separate the beer from various precipitates which form. Thus, wort pitched with yeast is placed in a starting tank, transferred to a fermentor, then to an aging tank and finally to a finishing tank before the beer is filtered and packaged. Each transfer leaves a residual sediment in the tank from which the beer is removed. There are several variations in the process used by different breweries, but they all use the common principle of successive processing stages to eliminate at least three precipitates, (1) trub, (2) primary yeast and (3) secondary yeast, each at the appropriate time.

In the past, the fermentation step has been conducted in tanks, open or closed, placed in a cold storage building known as a cellar. A cellar generally comprises a number of floors in a well-insulated building, the interior of which is cooled to maintain a proper fermentation temperature. Similarly, aging of the beer has also been conducted in tanks in a suitable cooled insulated building. In addition to the cost of the building and its maintenance, the air conditioning equipment, the refrigeration equipment required for cooling, the cost of operating the equipment and its maintenance and repair involve large investments and continuing large operating expenses. Furthermore, the production of beer in cold buildings requires that the workers perform their duties at temperatures considerably below normal room temperature, thus requiring special clothing and discomfort in working conditions. Also, the use of conventional cellars in the production of beer comprises a limitation or obstacle to ready plant expansion to increase beer production with market growth and increased consumption, because the conventional method of cellar construction does not accommodate incremental enlargements of a single tank or a few tanks. It is generally necessary to construct an entirely new building.

Because of the large capital investment in buildings and air conditioning and refrigeration equipment required in normal cellar brewing techniques of fermentation and aging, it has been proposed that outdoor insulated tanks be used. See, for example, Zinn U.S. Pat. No. 3,415,654 and Takayanagi U.S. Pat. No. 3,374,726 which pertain to the production of beer using outdoor insulated tanks for the fermentation and aging of beer. The use of outdoor insulated tanks for the fermentation and storage of beer provides a number of advantages over conventional cellar construction. Such outdoor tanks can be constructed of very large size and be placed directly on foundations at ground level. Cooling or refrigeration means need be provided only with a capability adequate to maintain the liquid in the tanks at a proper temperature during the fermentation, aging and finishing of beer therein. There is no need to cool the surrounding exterior uninsulated space outside of the tanks or to construct a building around the tanks. The cost of such insulated fermentation, aging and finishing tanks may be about 25 to 50 percent of the cost of erecting a conventional cellar for processing an equal quantity of beer.

While outdoor tanks have been used for the fermentation and aging operations in beer production, normally the fermentation step is conducted in one outdoor tank and thereafter the green beer is moved from the fermentation tank and sent to another outdoor tank for aging or even to conventional aging tanks in the cellar building. Such tanks have not been used successfully for effecting these operations consecutively in the same tank. The aging step has not been conducted in the same outdoor tank used for the fermentation because the outdoor tank used for the fermentation lacked means for promoting settling of the yeast and its subsequent removal in sufficient amount to place the green beer in such form as to be suitable for aging it in the same tank. For similar reasons after aging, whether conducted in a separate outdoor tank (one not used for the fermentation) or a tank located in a conventional cellar building, the beer has been transferred from the aging tank to a third tank for finishing. Tanks of the outdoor type in previous use for aging lacked suitable provision for facilitating a settling of solids during the aging process and their removal from the beer prior to conducting the finishing operation in the same tank.

According to one aspect of the present invention, there is provided a novel batch process of making beer which permits the fermentation, aging and finishing steps of the brewing process to be effected in the same tank without removing the beer therefrom between these steps. The whole cellar process of beer production can thus be effected in one tank. The beer can remain in the tank and the precipitated materials be removed from the bottom of the tank by novel procedures. The novel procedures of removing yeast and precipitated solids while not removing the liquid or beer in the tank are applicable to many varieties of brewing processes, including settling (i.e., the use of starting tanks), main fermentation, after fermentation, krausening, aging and finishing. However, it is not essential that all the novel procedures herein disclosed be utilized in beer production since some of the novel steps may be used and not the others. In addition, there is provided novel apparatus for use in such process as well as in other processes where it will be found useful. The apparatus reduces the need for labor by eliminating the need to transfer the beer from one tank to another and the associated need for repeated tank cleaning. The apparatus and process also eliminate the common procedure of men entering into the fermentors to push out the settled yeast to prepare the tank for the next fermentation.

According to the present invention, there is provided a batch process of making beer in which wort and yeast as a liquid mixture is subjected to fermentation at a controlled temperature cycle within the range of 20° to 75°F. in an enclosed tank. Towards the end of the fermentation, carbon dioxide from an external source can be supplied to a central area of the liquid above the tank bottom and advisably at a location which will always be above the upper surface of the mass of yeast and solids which settles on the bottom of the tank during the fermentation. The carbon dioxide gas bubbles upwardly at a rate which induces upward central flow of relatively cold liquid and thereby achieves cooling of the total liquid content of the tank by induced convection. During such upward movement of the central portion of the liquid, there is a peripheral slow downward flow of liquid along and about the tank wall and adjacent cooling means to effect cooling of the downwardly flowing liquid. The resulting controlled circulation of the liquid thereby maintains a fiarly close temperature gradient between the different parts of the liquid in the tank. The downward flow of the liquid around and about the tank wall serves to transport yeast and other solids to a settling zone on the bottom of the tank where there is little or minimal disturbance of the settling and settled yeast and other solids. The fermentation is continued until the desired degree of conversion has been obtained, normally close to end fermentation. At this stage the product is called green beer.

The central upward flow of carbon dioxide and beer, and the peripheral downward flow of beer, in the tank provides a circulation which induces flocculated yeast and other solids to settle to the tank bottom and to flow to the central area of the tank bottom from which it can be removed with a small amount of beer intermittently or continuously, and particularly towards the end of the fermentation. Without such circulation, the yeast and other solids would tend to settle by gravity as a rather uniform layer on the tank bottom. Yeast and other solids which settle in this manner become a rather compacted adherent mass which is difficult to move and which would be hard to remove from the tank bottom because of its flow resistance.

The settled yeast and other solids can be removed by suitable means, together with a small amount of beer. After separating the yeast and other solids from the small amount of withdrawn beer, the beer can be returned to the tank. It is an important feature of the invention to effect efficient settling of yeast and other solids and to be able to withdraw such settled material with only a small amount of beer. The beer making process, as a result, can be effected in the same tank from beginning to end, or such parts of the process as a brewmaster may want to conduct therein, and the solids removed from the tank with a small quantity of beer. Generally, no more than 20 percent of the beer need be removed from the tank to remove settled solids in the complete beer making operation conducted in the tank and usually the amount of beer removed need not be more than 5 to 10 percent of the total beer in the tank. After separating the solids from the removed beer, the beer can be returned to the tank.

Although yeast removal can be initiated after settling has been essentially completed, it is advisable to effect periodic or intermittent, or even continuous, yeast removal to (1) facilitate the yeast removal and (2) to minimize settled yeast imparting unwanted or undesirable flavors, which is known to occur in conventional brewing processes, to the beer. Since contact between beer and settled yeasts and other precipitates is recognized to impart a deleterious flavor when extended beyond certain time limits, minimizing such contact by periodic yeast removals should aid in obtaining desirable beer flavor. Since the dispersed yeast cells actively convert the wort to beer and provide the desirable flavors, the removal of settled or flocculated yeast provides conditions which favor production of high quality beer. Removal of settled yeast and other solids is accordingly advisably conducted during at least a major part of the fermentation period.

Once the fermentation is completed as described, the green beer can be processed according to conventional techniques. However, further advantages are achieved by combining the described novel fermentation with at least the novel aging procedure, subsequently described, in the same tank.

Once the fermentation is completed, and the yeast is removed, the green beer is cooled, advisably without removing it from the tank, to a temperature of about 29° to 33°F. and thereafter the green beer is aged. During aging, carbon dioxide gas can be bubbled upwardly through the beer in the same way as the carbon dioxide can be supplied towards the end of fermentation. The carbon dioxide can be supplied intermittently or continuously. The carbon dioxide flow rate is not critical in the aging stage, but should be adequate to maintain upward flow of beer in the central portion of the tank and downward flow of beer about the periphery of the tank to induce settling of solids. In addition to enhnacing solids settling, the bubbling carbon dioxide flow aids in release and removal of undesirable volatiles from the beer and thus speeds aging. The carbon dioxide, after bubbling through the beer, can be trapped, purified and reused. During, as well as after, the aging operation, separated solids are removed from the bottom of the tank. Finally the aged beer is subjected to a finishing treatment with additives, such as finings, proteolytic enzymes, tannins, bentionites and other chill-proofing agents, and antioxidants, or addition of other materials creating dilution, coloring or flavor changes in the product. At this stage a partial or full carbonation of the beer can be accomplished in the tank.

An appropriate positive internal pressure on the tank can be maintained during the entire processing sequence of fermentation, aging and finishing. To achieve a particularly economic construction of the tank with thin metal plates, it is desirable to select an operating counter-pressure as low as 3 inches of water (about 0.1 psig) and advisably 2 inches of water (about 0.07 psig). However, the solids separation can also be achieved while maintaining higher internal pressures. It is generally unnecessary to build the tank to withstand more than a maximum internal pressure of 2 psig above maximum hydrostatic pressure. Advisably, a practical upper counter-pressure limit is that at which the carbon dioxide saturation pressure corresponds to the carbon dioxide content desired in the beer.

The invention will now be described further in conjunction with the attached drawings in which:

FIG. 1 is an elevational view, partially broken away, of a novel outdoor tank provided by this invention for producing beer;

FIG. 2 is a vertical sectional view of the tank shown in FIG. 1;

FIG. 3 is an enlarged view of the lower part of the tank shown in section in FIG. 2;

FIG. 3A is an enlarged vertical view of the lower part of the tank of FIGS. 2 and 3 and shows the lower restraining band;

FIG. 4 is an elevational view showing the plate layout pattern for producing the vertical wall portion of a cylindrical tank as shown in FIGS. 1 to 3;

FIG. 5 is an isometric view of a laminated plate used in the tank wall for circulating a cooling medium therethrough;

FIG. 6 is a plan view of the manifold for supplying carbon dioxide to the beer;

FIG. 7 is an elevational view, partially in section, of the manifold;

Figure 8:
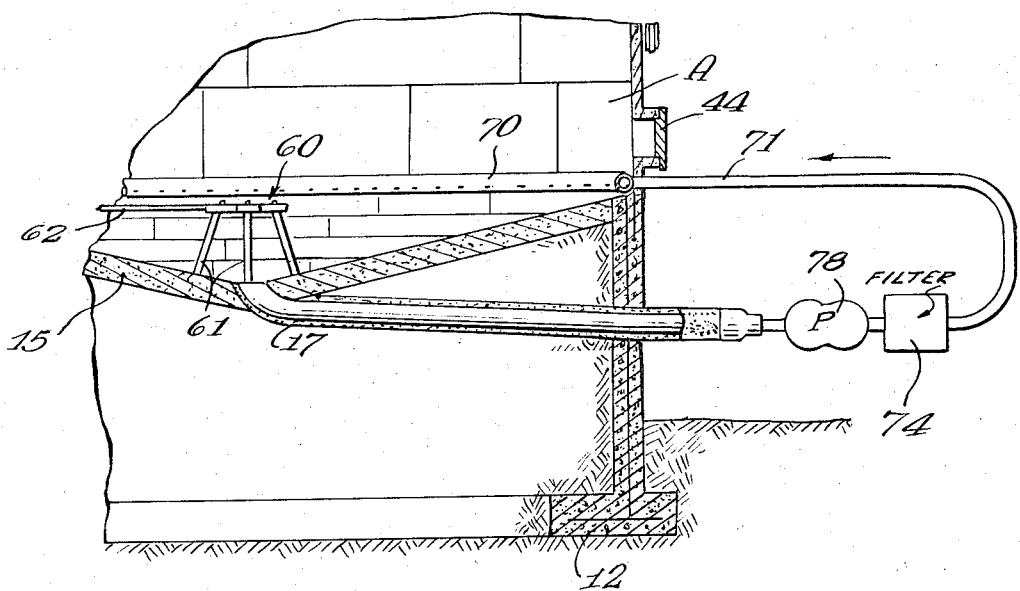
Figure 9:
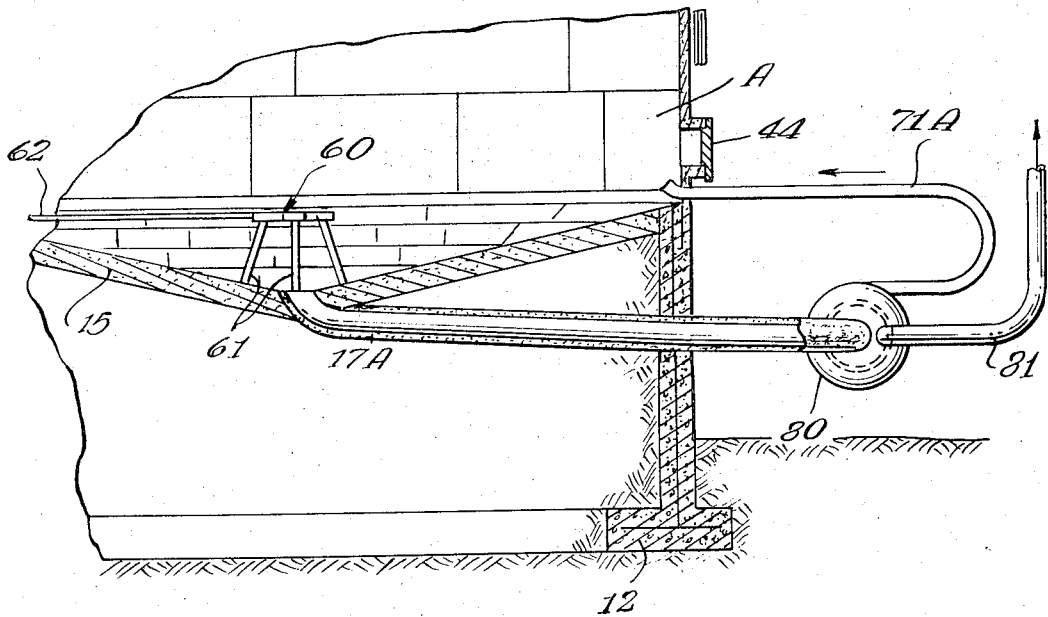

FIG. 8 is a vertical sectional view of the lower portion of a tank according to the invention showing pump means for withdrawing solids and fluid from the tank and for recirculating the fluid to the tank; and FIG. 9 is a vertical sectional view of the lower portion of a tank according to the invention showing another embodiment of apparatus for withdrawing fluid and solids from the tank and recirculating the fluid to the tank.

So far as is practical the same number will be used to identify the same elements or parts which appear in the different views of the drawings.

With reference to FIGS. 1 to 3, tank 10, of a generally cylindrical shape, is supported by a circular concrete foundation ring 11 which rests on concrete footing 12. The footing 12 and the lower portion of the foundation ring 11 are advisably placed below the surrounding ground level. Steel reinforcing bars 13 are positioned in concrete ring 11 and in footing 12 for added strength. Compacted earth fill 14 is placed inside of concrete foundation ring 11. The upper surface of earth fill 14 is concave, being generally conical and sloping gently toward the center of the concrete ring. On top of the compacted earth fill 14 there is placed a layer of vermiculite concrete insulation 15, such as of about 9 to 12 inches thick. Other suitable material can be used in place of vermiculite concrete provided it can withstand the compressive load to which it will be subjected and also constitutes a proper insulating barrier against heat transfer. A thin sheet or film, such as of polyvinyl chloride, can be placed on top of earch fill 14, before concrete 15 is poured in place, to provide a vapor barrier.

Tank 10 has a metal bottom 16, which is supported by vermiculite concrete 15. The bottom 16 is advisably made of a plurality of stainless steel sheets butt welded together. The interior surface of the welds is ground smooth to facilitate flow of liquid and solid materials from the tank by means of conduit or pipe 17 which is surrounded by insulation 18. Pipe 17 can be used to feed wort and yeast to the tank and to remove beer and settled yeast and other solids from the tank. Pipe 17 passes through foundation ring 11 above ground level to facilitate interconnecting it with pumps and other piping.

Bottom 16 is advisably shaped like a shallow cone and suitably has an angle of slope from the horizontal of about 5° to 25°, with about a 12° to 15° slope generally being most suitable. The use of a shallow conical bottom is economically advantageous since it minimizes the height and cost of the concrete supporting ring and makes access to the bottom lower and thus easier to reach. The conical bottom is provided with a highly polished metal surface or coating thereon to enhance sliding of the yeast and other precipitated materials to the central, lowermost portion of the conical bottom. A polytetrafluoroethylene (Teflon) coating on the metal bottom is representative of nonsticking coatings which can be used.

Apparatus which produces ultrasonic waves can also be positioned in the interior bottom portion of the tank to induce vibrations which loosen the settled yeast and facilitate its flow to the tank bottom outlet. Also, mechanical vibrators can be positioned in the tank bottom for the same purpose.

The interior end 19 of conduit 17 communicates with an opening axially located in the lowest area of bottom 16 to permit complete emptying of the tank. The peripheral edge portion 20 (FIG. 3) of bottom 16 is curved or dished upwardly to a vertical position to facilitate joining the lower edge 21 of the metal tank wall 22 thereto by a suitable circumferential butt weld. The bottom 16 can be made of 10 gauge stainless steel for a tank about 28 feet in diameter and about 35 feet high from the lowest point of the bottom to the top of the roof.

The wall 22 of tank 10 is shaped in the form of an upright cylinder having a circular cross-section. The wall can be made of a height appropriate for specific usage of the tank. For a tank 28 feet in diameter, a wall height of about 28 feet is quite suitable.

Wall 22 is conveniently made of a plurality of ring-like courses with each higher course positioned so that its lower edge rests on and is joined to the upper edge of the course below by a butt weld joint. As shown in FIGS. 2 and 4, the illustrated tank has seven courses A, B, C, D, E, F and G. Each course is conveniently fabricated of metal sheets having the same height and for economic reasons rectangular sheets are advisably employed, to the greatest extent possible, which are of standard available commercial sizes. The height of all the courses can be the same or some can be higher or lower than others. Generally, the tank provided herewith can be readily fabricated using plates 4 feet high for each course.

While the courses can be made of the same thickness, it is advantageous to make some of the upper courses thinner. Since there is less hydraulic pressure applied against the courses as they progress upwardly from the bottom, thinner less expensive plates or sheets can be used in some higher courses, with a considerable savings in capital investment and fabricating costs, than in lower courses. Course A thus can be 0.187 (3/16) inch thick, course B can be 0.140 inch (10 ga.) thick and courses C to G can be 0.109 inch (12 ga.) thick. While thinner plates or sheets could withstand the hydraulic forces applied against the upper courses, there is a need for rigidity to resist buckling and wind forces which could not be adequately supplied by thinner plates without resorting to ancillary expensive stiffening elements.

A series of metal straps 27 (FIGS. 3 and 3A) can be positioned around the base portion of the tank wall 22. The lower ends of straps 27 are fixedly embedded in foundation 11 by placing them in the concrete while it is poured and maintaining them in position until it solidifies. A metal band or ring 23 is placed around and in tight contact with the bottom periphery of the tank wall and the upper parts of the straps 27 are welded thereto. Ring 23 can, if desired, be welded to the tank wall. By tying the tank to the foundation in this way, the tank is prevented from sliding or tipping.

The top of the tank is covered by a suitable roof 30 which, as shown in the drawings, is domed although it can be conical, semi-eliptical, flat or some other shape. The roof is also advisably made of stainless steel sheets butt welded together at their edges. A ring 31 is placed around the upper portion of wall 22 to provide an increased structural strength. Hole 32 is centrally located in roof 30 and covered with vent cap 33 from which pipe 34 extends outwardly and then dowwardly along the side of the tank to terminate in a filter 35. Pipe 34 is covered with insulation 36 to prevent heat leak into the tank.

Conduit 40 extends upwardly along-side of tank 10, then horizontally above the roof 30 and into vent cap 33 from which it descends by extension pipe 41 into the tank itself. The extension pipe 41 is provided with a suitable spray nozzle 42 at its lower end for spraying cleaning solution throughout the tank to completely clean all interior surfaces. The pipe 41 and nozzle 42 can also be used to introduce and distribute within the tank any and all additives which a brewer customarily uses to clarify and stabilize the beer as well as to introduce flavoring and coloring substances. The spray nozzle 42 and pipe 41 are permanently installed and remain in position when the tank is used for beer production. The length of pipe 40 outside of the tank is covered with insulation 43 to retard heat leak.

A manhole 44 is provided near the bottom of tank wall 22 to permit manual inspection of the tank interior and for access to make repairs when needed.

Tank wall 22 is externally insulated 45, such as with polyurethane foam, and the insulation is covered with a weather barrier 46, such as of aluminum sheet. Roof 30 is similarly covered with insulation 47 which in turn is covered with a wather barrier 48 which can also be made of alumnium sheet. The tank is thus completely insulated permitting close control of the tank contents at temperatures either above or below ambient temperature. In beer production, close temperature control of the liquid contents is important to effect optimum fermentation, satisfactory aging and precise finishing of the beer in such a tank.

Although the tank as so far described can be provided with any suitable means to heat or cool the contents, such as installation of internal cooling coils, it is an important additional part of the invention to incorporate, as an integral part of the tank wall, means to achieve indirect heat transfer with the contents of the tank to raise or lower its temperature. Thus, there is incorporated in the tank wall, at a suitable location, at least one laminated heat transfer metal plate having passage ways through which a cooling or heating fluid, be it gas or liquid, can be circulated. The laminated heat transfer plate is incorporated into the tank wall in lieu of any metal sheet which would otherwise be used for the same part or area of the wall. Furthermore, the heat transfer plate so incorporated in the tank wall requires no reinforcing or back-up structure but withstands safely all hydraulic forces applied in tank usage as well as compressive forces applied by that part of the tank structure which it supports. Incorporating a laminated heat transfer plate in the tank wall improves cooling efficiency. The standard 0.25 sq. ft. of cooling surface per barrel capacity can be reduced about 35 to 50 percent by using the laminated heat transfer plate in the tank wall.

FIG. 5 illustrates partially one form of a laminated heat transfer plate which can be used in the tank of this invention. The heat transfer plate 50 has a smooth surfaced inner stainless steel sheet 51, which can be 12 gauge thick, and an outer stainless steel sheet 52 which can be 18 gauge thick. Sheet 52 has an undulating or quilted contour. Spot welds 53 joining outside sheet 52 to inside sheet 51 constitute low areas and the spaces between the spot welds constitute high areas. Heat transfer plate 50 is generally welded about its periphery 54 to seal the edges of sheets 51 and 52 together in a line which is normally straight before the plate is curved to the radius of the tank wall. Mueller U.S. Pat. No. 3,458,917 discloses such heat transfer plates and is incorporated herein by reference.

Heat transfer plate 50 is readily produced in a rectangular shape and of such height and length as to permit its ready use in the tank wall in place of a regular metal sheet. As shown in FIG. 4, a series of heat transfer plates 50 is used in course E and they are of the same height as the other regular plates used in the course. Conventional butt welds are used to join the edges of heat transfer plates 50 to the adjoining edges of the plates used in the wall construction. The result is an essentially smooth walled tank both inside and outside and one which is built at comparatively low cost.

The number and size of heat transfer plates 50 employed in any tank will be governed by the use to which the tank is to be put, the thickness of the insulation and the temperature required for the liquid contents. For beer fermentation and aging, the capacity of the plates adivsably should be adequate to effect a 10°F. temperature change in the beer in a 24 hour period. The heat transfer plates can be located in one course, a plurality of courses or interspersed in the tank wall.

Fluid is circulated through heat transfer plates 50 by means of an inlet conduit 55 and an outlet conduit 56 (FIGS. 2 and 5) with which each plate is equipped. The fluid can be a gas or liquid and at a higher or lower temperature than the tank contents to heat or cool the same. The inherent structural strength of the heat transfer plates 50 permit circulation of a fluid through them at comparatively high pressure. Thus, they can withstand pressures of over 150 psi which is more than adequate to permit direct circulation of liquid ammonia through the plate for cooling purposes. Normally, an ammonia refrigeration plant is used to first cool brine or ethylene glycol and the cooled brine or ethylene glycol is then circulated through a heat exchanger means to cool beer in process because the heat exchanger cannot withstand the high pressure ammonia. The tank as described avoids the previous need to cool brine or ethylene glycol and permits direct circulation of liquid ammonia through the heat transfer plates 50, thus simplifying refrigeration installation and lowering costs. Since liquid ammonia can be used directly, a greater cooling efficiency can be achieved than with brine or ethylene glycol permitting use of a smaller cooling surface area than would otherwise be required.

Located centrally near the bottom of tank 10 is manifold 60 (FIGS. 2, 6 and 7) supported on legs 61 by, but above, the bottom 16 of the tank. Manifold 60 consists of six pipes welded together forming a hexagonally shaped ring. Pipe 62 communicates from outside the tank with manifold 60 and is used to supply carbon dioxide gas thereto from which it exits upwardly through ports 63 in the top of the manifold. Any number of ports can be used as needed to supply the required amount of gas at an acceptable rate. When used for beer production, manifold 60 is mounted sufficiently high above the tank bottom to avoid disturbing the yeast settled or settling to the bottom. It should be understood that a manifold need not be included in the tank if the tank is to be used for a purpose which does not require supplying carbon dioxide to it. The tank, including the novel heat transfer structural aspects incorporated therein, has other uses than solely in beer production and is accordingly considered a multipurpose tank.

The mixture of settled yeast and precipitated solids may be removed through conduit 17 by gravity or by means of a speed regulated solid displacement pump such as a "Moyno" (Robins and Meyer) pump. The pump may be operated continuously, intermittently, or only during the final settling phase, of the fermentation to remove the yeast and precipitated solids as they settle and move to the apex of the conical bottom. The rate of pumping can be adjusted to remove the solids without withdrawing an excessive amount of green beer. Also, the pumping may be started after the settling of yeast and precipitated solids is complete. The rate of pumping is adjusted to match the gravity flow of the yeast and the precipitated solids to the apex of the cone so as to avoid withdrawing any excess of green beer.

To aid in the removal of solids which settle to the bottom of the tank, whether from beer production or from some other processing operation conducted in the tank, a tubular element or ring 70 can be internally mounted adjacent the juncture of tank bottom 16 and wall 22 by spaced apart brackets 72 which position it slightly away from the adjoining inside tank surfaces (FIGS. 2, 3 and 8). Brackets 72 are advisably vertically positioned but they can also be horizontal or positioned at an angle. The diameter of ring 70 is slightly smaller than the tank to permit clearance for solids to flow around it downwardly on both of its sides. A plurality of holes 73 are located in ring 70 to direct liquid which exits from the ring in a downwardly direction along the tank bottom towards the center of the bottom. This fluid flow moves solid material along the bottom and to opening 19 from which it can be removed by conduit 17. As shown in FIG. 8, conduit 17 communicates with positive displacement pump 78 to remove liquid and solids. The pump 78 forces the mixture through filter 74, or other suitable means to separate the solids, and the liquid is thereafter conveyed to conduit 71. Liquid is supplied by pipe 71 to ring 70 as needed for this purpose. Of course, when no solids occur in use of the tank, ring 70 need not be installed. In beer production its use is an important feature in achieving yeast and other solids removal as will be described later. While a tank could be constructed with a deep conical bottom to facilitate solids removal, this would be uneconomical since the tank would have to be made much higher to accommodate the higher cone and more expensive materials would be needed in its construction.

The tank embodiment of FIG. 9 is similar to the one shown in FIG. 8 except that the tank of FIG. 9 is not provided with a ring 70 shown in FIG. 8. The liquid and solids are removed by conduit 17A in FIG. 9 by means of centrifugal separator 80. Solids are expelled through conduit 81 while the liquid is returned to the tank through conduit 71A. This system can be used when it is not desired to employ the returning liquid to aid in solids settling and removal.

Although the described tank and its various disclosed embodiments can be used for other purposes, it is primarily intended as an outdoor tank for producing beer utilizing the novel process previously summarized herein. Its utilization in beer production will therefore be described further with particular reference to that process.

Previously prepared wort is pumped into tank 10 through conduit 17 until the tank is about nine-tenths full. The upper one-tenth of the tank interior is later occupied by foam formed in the beer fermentation. The wort can be pitched with yeast as it is pumped into the tank or after it is in the tank.

The main fermentation is normally conducted at a temperature of about 40° to 75°F., while after-fermentation or krausening can be conducted at considerably lower temperatures ranging rrom 50° to 29°F. according to a receding temperature schedule. The specific temperature cycle is selected to facilitate growth and fermentation for the particular yeast involved. The temperature of the liquid in the tank is controlled by passing a heating or cooling fluid through heat transfer plates 50. Cooling is generally required to remove the heat produced by the fermenting yeast. As the fermentation progresses, carbon dioxide gas is supplied by manifold 60 and it bubbles upwardly inducing upward circulation of the central portion of the liquid. The downward flow of the liquid along the tank walls aids in settling yeast by bringing it to the bottom and depositing it in a relatively quiescent zone. The carbon dioxide can be recovered by pipe 34, purified and re-used if desired. Simultaneously, the cooling action of heat transfer plates 50 lowers the temperature of the liquid adjoining the tank interior causing it to flow downwardly. The resulting gentle liquid circulation brings the temperature of the liquid mass into a narrow range. The greatest temperature different between various points in the bulk of the liquid can be brought to less than 0.5°F. Towards the end of the cooling cycle the temperature difference between the cooling jacket and the liquid mass can be less than 5°F. The induced convection by means of carbon dioxide injection makes it possible to perform cooling effectively while maintaining a temperature difference of no more than 1°F. between the cooling jacket and the bulk of the liquid. In this way it is possible that the final temperature in the liquid mass may be brought to within 1°F. of its freezing point without causing ice formation on the cooling surface.

When the fermentation is completed or to be terminated, the yeast must be removed before the green beer is aged. A large amount of settled yeast, and other solids, together with a small fraction or amount of green beer, can be removed by conduit 17 from the bottom of the tank. The green beer can be filtered or centrifuged to separate the yeast and other solids and the beer can then be pumped by conduit 71 into ring 70 and out holes 73 which causes fluid flow along the tank bottom with washing of yeast to conduit 17. Yeast removal is continued in this manner until the yeast content is low enough the age the beer. Carbon dioxide flow through manifold 60 can continue during yeast removal or be stopped.

Following removal of the yeast the beer is aged for a period of 2 to 20 days. The aging period depends on the type of beer being produced, the yeast used, and other factors. The beer is normally aged at a temperature of about 29° to 33°F., which is too low for yeast growth. It can be brought to this temperature before or after yeast removal by circulating cooling fluid through heat transfer plates 50. Furthermore, the space occupied by the foam during fermentation can be filled with green beer from another tank since aging involves essentially no foam formation. Thus, the foam space of nine tanks can be filled with green beer from a tenth tank by conduit 71 for aging and the tenth tank thereby freed for another fermentation. The beer from another tank can be suplied through ring 70 so that the filling operation also aids in effecting settling of solids.

During the aging, carbon dioxide is fed through manifold 60 to the beer to promote gentle circulation, avoid temperature stratification and achieve uniform carbonation. Essentially no counter-pressure need be employed in the aging process thereby making it possible to conduct the operation in the thin walled tank made possible by this invention. If a counter-pressure were to be employed in the aging step a much more expensive, heavier walled tank would be needed.

As the aging progresses undesirable volatiles are expelled from the beer with the carbon dioxide and solids precipitate out and settle to the bottom. The carbon dioxide can be recovered such as by pipe 34, purified and recycled to pipe 62. The solids may be left in the tank until aging is terminated or they may be removed periodically by conduit 17. The beer and solids removed by conduit 17 can be filtered or centrifuged and the beer then fed to pipe 71 and thereby to ring 70. As the beer flows out holes 73 in ring 70 it aids in flushing solids out conduit 17.

After aging is terminated the beer can be finished in the same tank. Antioxidants and proteolytic enzymes normally used in finishing can be supplied to the beer by conduits 17 and 62 or spray 42. The beer obtained from the finishing step can be supplied with carbon dioxide after it has been removed from the tank and is being piped to a packaging room.

While carbonation can be achieved as described, it is an important aspect of this invention to effect carbonation of the beer without applying a significant counter-pressure. In conventional finishing a counter-pressure of about 10–15 psig is ordinarily created during carbon dioxide injection to carbonate the beer. Without a significant counter-pressure, a thin walled tank such as herein described can be used for the carbonation. No significant counter-pressure is involved in the finishing operation so the tank need only withstand the hydraulic pressure.

Carbonation of the beer without a significant counter-pressure can be achieved according to this aspect of the invention by injecting carbon dioxide into the bottom of a volume of beer at least twenty feet high. Carbon dioxide may be fed to the beer, during finishing, through manifold 60. Carbon dioxide dissolves readily in beer when injected at a point 20 feet below the surface of the beer and the dissolved carbon dioxide does not escape as readily from the beer surface. Consequently, the carbon dioxide content of the beer increases until it reaches saturation (2.8 vols. $CO_2$ at 32°F.) at the injection point. From then on the injected carbon dioxide gas bubbles through the beer and escapes at the surface. The carbonation entrails dynamic equilibrium because the dissolved carbon dioxide continues to escape from the surface at a slow rate. This loss is made up by carbon dioxide injection into the beer at the injection point. The rate of carbon dioxide injection is advisably one which makes up for the escape of dissolved carbon dioxide and provides a flow of carbon dioxide bubbles through the beer for the purpose of promoting settling of solids, temperature control, carbonation control, blending and operational control. A main advantage of the dynamic equilibrium beer carbonation process is that it can be performed in a nonpressurized tank or under a very light counter-pressure such as 2 inches of water pressure. Conventional carbonation of beer is performed under a counter-pressure of about 10 to 15 psig and it is common practice for brewers to specify a design pressure of 15 psig for carbonating tanks. The cost of a tank designed to withstand 15 psig pressure is considerably greater than for a nonpressurized tank of equal design and dimensions. The tank cost reduction which this carbonation procedure makes possible is particularly significant for large outdoor tanks for finishing. Of course, the same tank can be used for the fermentation and aging as well as finishing steps.

The foregoing detailed description has been given for clearance of understanding only, and no unnecessary limitations should be understood therefrom, as modifications will be obvious to those skilled in the art.

What is claimed is:

1. A large size thin-shelled outdoor metal tank comprising:

a tank designed to withstand a maximum internal pressure of 2 p.s.i.g. above hydrostatic pressure, and with a conical metal bottom having a shallow slope of from 5° to no more than 25° from the horizontal;

a conduit communicating with the tank interior at the apex of the conical bottom;

a circular cylindrical vertical metal wall joined to the bottom, said wall having cooling means;

a metal roof jointed to and supported by the vertical wall;

insulation exterior of the bottom, wall and roof;

a vent opening in the roof;

a manifold centrally located in the tank spaced above the bottom and the level of unsuspended solids which may settle therein, said manifold having a plurality of openings through which carbon dioxide gas can exit only centrally into liquid in the tank; and a pipe leading from outside the tank to the manifold for supplying carbon dioxide thereto.

2. A tank according to claim 1 in which the conduit communicating with the bottom of the tank extends to a pump for removing solids and liquid from the tank bottom, means communicating with the pump for separating the solids from the liquid and conduit means for returning the separated liquid to the tank.

3. A large size thin-shelled outdoor metal tank comprising:

a tank with a conical metal bottom having a shallow slope of no more than 25° from the horizontal;

a conduit communicating with the tank interior at the apex of the conical bottom;

a circular cylindrical vertical metal wall joined to the bottom;

a metal roof joined to and supported by the vertical wall;

insulation exterior of the bottom, wall and roof;

a vent opening in the roof;

a manifold centrally located in the tank spaced above the bottom and the level of unsuspended solids which may settle therein, said manifold having a plurality of openings through which carbon dioxide gas can exit into liquid in the tank;

a pipe leading from outside the tank to the manifold for supplying carbon dioxide thereto;

a tubular ring positioned inside the tank adjacent the periphery of the bottom;

a pipe communicating with the ring and the exterior of the tank for supplying fluid to the ring; and a plurality of holes in the ring from which fluid under pressure can be ejected along the slope of the bottom to wash solids to the conduit in the bottom for removal.

4. A large size thin-shelled outdoor metal tank comprising:

a tank with a conical metal bottom having a shallow slope of no more than 25° from the horizontal;

a circular cylindrical vertical metal wall joined to the bottom;

a metal roof joined to and supported by the vertical wall;

insulation exterior of the bottom, wall and roof;

a vent opening in the roof;

a manifold centrally located in the tank spaced above the bottom and the level of unsuspended solids which may settle therein, said manifold having a plurality of openings through which carbon dioxide gas can exit into liquid in the tank;

a pipe leading from outside the tank to the manifold for supplying carbon dioxide thereto;

a conduit communicating with the tank interior at the apex of the conical bottom extending to a pump for removing solids and liquid from the tank bottom;

means communicating with the pump for separating the solids from the liquid; and conduit means for returning the separated liquid to a tubular ring inside the tank adjacent the periphery of the bottom, said ring having a plurality of holes from which the fluid under pressure can be ejected along the slope of the tank bottom.

5. A large size thin-shelled outdoor metal tank comprising:

a tank with a conical metal bottom having a shallow slope of no more than 25° from the horizontal;

a conduit communicating with the tank interior at the apex of the conical bottom;

a circular cylindrical vertical metal wall jointed to the bottom;

the tank wall having a plurality of metal courses, each course being cylindrical, of uniform height and formed of a plurality of metal rectangular sheets curved to a cylindrical segment and joined together, and at least one course having a plurality of laminated rectangular curved heat transfer plates integrally incorporated in, and part of, the tank wall;

a metal roof joined to and supported by the vertical wall;

insulation exterior of the bottom, wall and roof;

a vent opening in the roof;

a manifold centrally located in the tank spaced above the bottom and the level of unsuspended solids which may settled therein, said manifold having a plurality of openings through which carbon dioxide gas can exit into liquid in the tank; and a pipe leading from outside the tank to the manifold for supplying carbon dioxide thereto.

6. A large size thin-shelled outdoor metal tank comprising:

a tank designed to withstand a maximum internal pressure of 2 p.s.i.g. above hydrostatic pressure, and with a conical metal bottom having a shallow slope of from 5° to no more than 25° from the horizontal;

a conduit communicating with the tank interior at the apex of the conical bottom;

a circular cylindrical vertical metal wall joined to the bottom;

the tank wall having a plurality of metal courses, each course being cylindrical, of uniform height and formed of a plurality of metal rectangular sheets curved to a cylindrical segment and joined together, and at least one course having a plurality of laminated rectangular curved heat transfer plates integrally incorporated in, and part of, the tank wall;

a metal roof joined to and supported by the vertical wall;

insulation exterior of the bottom, wall and roof; and a vent opening in the roof.

7. A large size thin-shelled outdoor metal tank comprising:

a tank designed to withstand a maximum internal pressure of 2 p.s.i.g. above hydrostatic pressure, and with a conical metal bottom having a shallow slope of from 5° to no more than 25° from the horizontal;

a conduit communicating with the tank interior at the apex of the conical bottom;

a circular cylindrical vertical metal wall joined to the bottom, said wall having cooling means;

a metal roof joined to and supported by the vertical wall;

a vent opening in the roof;

a manifold centrally located in the tank spaced above the bottom and the level of unsuspended solids which may settle therein, said manifold having a plurality of openings through which carbon dioxide gas can exit only centrally into liquid in the tank; and a pipe leading from outside the tank to the manifold for supplying carbon dioxide thereto.

8. A large size thin-shelled outdoor metal tank comprising:
- a tank with a conical metal bottom having a shallow slope of no more than 25° from the horizontal;
- a conduit communicating with the tank interior at the apex of the conical bottom;
- a circular cylindrical vertical metal wall joined to the bottom;
- a metal roof joined to and supported by the vertical wall;
- a vent opening in the roof;
- a manifold centrally located in the tank spaced above the bottom and the level of unsuspended solids which may settle therein, said manifold having a plurality of openings through which carbon dioxide gas can exit into liquid in the tank;
- a pipe leading from outside the tank to the manifold for supplying carbon dioxide thereto;
- a tubular ring positioned inside the tank adjacent the periphery of the bottom;
- a pipe communicating with the ring and the exterior of the tank for supplying fluid to the ring; and
- a plurality of holes in the ring from which fluid under pressure can be ejected along the slope of the bottom to wash solids to the conduit in the bottom for removal.

9. A large size thin-shelled outdoor metal tank comprising:
- a tank with a conical metal bottom having a shallow slope of no more than 25° from the horizontal;
- a circular cylindrical vertical metal wall joined to the bottom;
- a metal roof joined to and supported by the vertical wall;
- a vent opening in the roof;
- a manifold centrally located in the tank spaced above the bottom and the level of unsuspended solids which may settle therein, said manifold having a plurality of openings through which carbon dioxide gas can exit into liquid in the tank;
- a pipe leading from outside the tank to the manifold for supplying carbon dioxide thereto;
- a conduit communicating with the tank interior at the apex of the conical bottom extending to a pump for removing solids and liquid from the tank bottom;
- means communicating with the pump for separating the solids from the liquid; and
- conduit means for returning the separated liquid to a tubular ring inside the tank adjacent the periphery of the bottom, said ring has a plurality of holes from which the fluid under pressure can be ejected along the slope of the tank bottom.

10. A large size thin-shelled outdoor metal tank comprising:
- a tank with a conical metal bottom having a shallow slope of no more than 25° from the horizontal;
- a conduit communicating with the tank interior at the apex of the conical bottom;
- a circular cylindrical vertical metal wall joined to the bottom;
- the tank wall having a plurality of metal courses, each course being cylindrical, of uniform height and formed of a plurality of metal rectangular sheets curved to a cylindrical segment and joined together, and at least one course having a plurality of laminated rectangular curved heat transfer plates integrally incorporated in, and part of, the tank wall;
- a metal roof joined to and supported by the vertical wall;
- a vent opening in the roof;
- a manifold centrally located in the tank spaced above the bottom and the level of unsuspended solids which may settle therein, said manifold having a plurality of openings through which carbon dioxide gas can exit into liquid in the tank; and
- a pipe leading from outside the tank to the manifold for supplying carbon dioxide thereto.

11. A large size thin-shelled outdoor metal tank comprising:
- a tank designed to withstand a maximum internal pressure of 2 p.s.i.g. above hydrostatic pressure, and with a conical metal bottom having a shallow slope of from 5° to no more than 25° from the horizontal;
- a conduit communicating with the tank interior at the apex of the conical bottom;
- a circular cylindrical vertical metal wall joined to the bottom;
- the tank wall having a plurality of metal courses, each course being cylindrical, of uniform height and formed of a plurality of metal rectangular sheets curved to a cylindrical segment and joined together, and at least one course having a plurality of laminated rectangular curved heat transfer plates integrally incorporated in, and part of, the tank wall;
- a metal roof joined to and supported by the vertical wall; and
- a vent opening in the roof.

* * * * *